(12) United States Patent
Mehta (10) Patent No.: US 12,518,039 B2
(45) Date of Patent: Jan. 6, 2026

(54) SECURE COLLABORATIVE LABORATORY DATA ANALYTICS SYSTEM

(71) Applicant: Roche Diagnostics Operations, Inc., Indianapolis, IN (US)

(72) Inventor: Kumar Roshan Mehta, Ludwigsburg (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 180 days.

(21) Appl. No.: 18/279,833

(22) PCT Filed: Feb. 28, 2022

(86) PCT No.: PCT/EP2022/054937
§ 371 (c)(1),
(2) Date: Aug. 31, 2023

(87) PCT Pub. No.: WO2022/184618
PCT Pub. Date: Sep. 9, 2022

(65) Prior Publication Data
US 2024/0152641 A1 May 9, 2024

(30) Foreign Application Priority Data
Mar. 2, 2021 (EP) .................................... 21160240

(51) Int. Cl.
*G06F 21/62* (2013.01)
*H04L 9/08* (2006.01)

(52) U.S. Cl.
CPC ............ *G06F 21/6218* (2013.01); *H04L 9/08* (2013.01)

(58) Field of Classification Search
CPC ......... G06F 21/6218; G06F 2221/2107; G06F 21/74; G06F 21/6245; H04L 9/08
See application file for complete search history.

(56) References Cited

U.S. PATENT DOCUMENTS

| 11,610,012 B1* | 3/2023 | Della Maggiora ... G06F 21/645 |
| 2009/0323932 A1* | 12/2009 | Youn ........................ H04L 9/002 380/28 |

(Continued)

FOREIGN PATENT DOCUMENTS

| EP | 3333747 A1 | 6/2018 |
| KR | 20190118458 A | 10/2019 |
| WO | 2018140164 A1 | 8/2018 |

OTHER PUBLICATIONS

Extended European Search Report, dated Aug. 13, 2021, for European Patent Application No. 21160240.4, 13 pages.

(Continued)

*Primary Examiner* — Henry Tsang
(74) *Attorney, Agent, or Firm* — MORRISON & FOERSTER LLP (57) ABSTRACT

A method of creating a secure collaborative analysis system for securely using a dataset from a plurality of laboratories (150) while ensuring confidentiality, integrity, and authenticity of input and result data among the plurality of collaborating laboratories (150) is presented. The plurality of laboratories (150) are communicatively connected to an execution environment. The method comprise creating a secure enclave (110) within the execution environment for data exchange and analysis, attestation of the execution environment and the secure enclave (110) to verify integrity and authenticity of the system, generating a random 12-byte character inside the secure enclave (110) to provide integrity protection for storing records in a database (130), and building a communication component to provide a means of secure communication between the plurality of laboratories (150) and the execution environment. The communication component comprises a trusted section within the secure enclave (110) and an unprotected section. The plurality of laboratories (150) communicate with the trusted part via a (Continued)

secure channel. The method further comprises detecting any unauthorized modification to the record stored in the database (130) outside of the secure enclave (110) by a records integrity component, storing the encrypted dataset in the persistent storage disk (120) received from the plurality of laboratories (150), retrieving the encrypted dataset inside the secure enclave (110), decrypting the encrypted dataset inside the secure enclave (110), providing the decrypted dataset to an analysis engine component within the secure enclave (110) for analysis, and providing results of that analysis to plurality of laboratories (150) in the secure manner.

16 Claims, 9 Drawing Sheets

(56) References Cited

U.S. PATENT DOCUMENTS

| | | | | |
|---|---|---|---|---|
| 2019/0347399 | A1* | 11/2019 | Cramer | G06T 17/20 |
| 2019/0362083 | A1* | 11/2019 | Ortiz | H04L 9/321 |
| 2020/0044844 | A1* | 2/2020 | Sridhara | H04W 12/03 |
| 2020/0327250 | A1* | 10/2020 | Wang | G06N 20/00 |
| 2021/0133354 | A1* | 5/2021 | Yadav | G06F 21/6254 |

OTHER PUBLICATIONS

International Search Report and Written Opinion, mailed Jun. 8, 2022, for PCT Application No. PCT/EP2022/054937, filed Feb. 28, 2022, 15 pages.

International Preliminary Report on Patentability, issued Aug. 29, 2023, for PCT Application No. PCT/ EP2022/054937, filed Feb. 28, 2022, 14 pages.

* cited by examiner

SECURE COLLABORATIVE LABORATORY DATA ANALYTICS SYSTEM

CROSS REFERENCE TO RELATED APPLICATIONS

This application is a national stage application under 35 U.S.C. § 371 of International Application No. PCT/EP2022/054937, filed internationally on Feb. 28, 2022, which claims priority to and benefit of EP patent application Ser. No. 21/160,240.4, filed Mar. 2, 2021, the disclosures of which are hereby incorporated herein by reference in their entirety.

TECHNICAL FIELD

The present disclosure generally relates to a method and system for a client-server based collaborative laboratory data analytics.

BACKGROUND

In today's world, several clinical laboratories exist that are spread over multiple geographical areas and/or belong to different entities where each laboratory provides a specific set of analytical capabilities. Each of these clinical laboratories collect and analyze patient data such as, for example, name, contact address, email, and sample from which sensitive attributes about the health of a patient such as, for example, DNA information, from which disease information can be inferred.

Due to the concern of privacy and security of the patient's data, each of the laboratories has their own data analytics and storage platform that work in isolation from other laboratory data. The different laboratories are unable to share data among each other for any collaborative analysis over the fear of data theft, patient's privacy as well as due to various medical data sharing regulations such as, for example, the Clinical Data Interchange Standards Consortium (CDISC). Any unauthorized disclosure may lead to various forms of discrimination and violation of fundamental tights (see, e.g., Article 9 of the GDPR). Moreover, even for individual laboratory solution, its analytics platform can be hosted on a third-party server where patient's data is stored, analyzed, results are computed. A data analytics platform such as for DNA analysis can have high computation, large data storage requirements and performing analytics on a client machine or on premises can be inefficient, costly, and insufficient for laboratories. Therefore, in a third-party hosted analytics solution, the burden of infrastructure maintenance is transferred from the laboratories to the third-party infrastructure provider. Further, the use of third-party infrastructure providers can be cost-effective.

In any laboratory analytic system, the following parties can be involved:
  Collaborative laboratories that own patient data—considered honest but curious regarding the data and results of other collaborators while, at the same time, seeking the privacy of their own patient data. The collaborative laboratory does not depart from the generally established protocol but also tries to know more than what it is expected to learn.
  Analytics application—checked for correction by code and software audit review process
  Third-party infrastructure provider—inherently untrusted.

In addition, several problems exist with trying to conduct collaborative laboratory data analytics.

1. Compels trust in third-parties
   Demands laboratories to have complete reliance on the honest and trustworthiness of the third party. Also requires the belief that the execution environment is free from malware or malicious entry. Moreover, the cloud system is often shared among multiple organizations, running many different applications, which also requires trust in the security of the cloud.
   Attack surface is very large and anything from the system software (e.g., the operating system (OS)) to the system administrator could be malicious and can possibly learn sensitive information from the laboratory analysis. The Trusted Computing Base (TCB) of such analytics solution in very large and can include everything from machine hardware to the analytics application.
   Bad security configuration could introduce vulnerabilities to external attackers
   Some powerful organizations such as, for example, foreign government bodies, can have an interest in retrieving patient data which could be collected from the third-party system where the analytic application is running due to the fact the third-party may maintain all the data at one place.
2. Data theft possibilities
   At storage
     Could be secured by encryption but the encryption keys have to available to the analytics system
   During transfer/communication
     Could be secured by encryption, for example, using TLS/HTTPS
   During analysis
     Requires input data to be in plain text at some point in the analysis cycle and, at that time, input data could be stolen and/or learned
     The analysis result is in plain text initially which could be learned and/or modified before it is encrypted or received by the intended laboratory
     The integrity of the plain text input data or results cannot be guaranteed
3. Unintended modification of analytic application
   Laboratories cannot remain confident that the analysis application that is used is the one which is advertised and published because the actual analysis application may have been modified by malware/privileged ring-0 application present in the untrusted infrastructure The above-mentioned issues make different laboratory systems reluctant to adopt and use a collaborative analytics framework deployed on any third-party infrastructure as the privacy and integrity of the input data and the results are often extremely critical in medical data analysis. The different laboratory systems tend to not collaborate out of the fear that sensitive attributes of patient data could be learned by the other collaborating parties, as well as possible the infrastructure provider, and hence the different laboratory systems are limited by a small data set of only their own patients for any data analytics.

Therefore, there is a need for an analytics system that can help reduce the trust requirement from the third-party infrastructure provider while making sure that any analysis of patient data in an untrusted environment does not reveal any sensitive information to an unintended entity, including the privileged ring-0 application in the third-party infrastructure, the system administrator, or any of the other collaborating parties. In other words, there is a demand for an analytics system that provides secure remote computation and analysis with the guarantee of confidentiality, integrity, and authenticity of input and result data at all times.

SUMMARY

The use of the 'a' or 'an' can be employed to describe elements and components of the embodiments herein. This is done merely for convenience and to give a general sense of the inventive concepts. This description should be read to include one or at least one and the singular includes the plural unless it is obvious that it is meant otherwise.

The term 'laboratory instrument' or "laboratory device" as used herein can encompass any apparatus or apparatus component operable to execute and/or cause the execution of one or more processing steps/workflow steps on one or more biological samples and/or one or more reagents. The expression 'processing steps' thereby can refer to physically executed processing steps such as centrifugation, aliquotation, sample analysis and the like. The term 'instrument' can cover pre-analytical instruments, post-analytical instruments, analytical instruments and laboratory middleware.

A 'data storage unit' or 'database' can be a computing unit for storing and managing data such as a memory, hard disk or cloud storage. This may involve data relating to biological/medical sample(s) to be processed by the automated system. The data management unit may be connected to an LIS (laboratory information system) and/or an HIS (hospital information system). The data management unit can be a unit within or co-located with a laboratory instrument. It may be part of the laboratory middleware. Alternatively, the database may be a unit remotely located. For instance, it may be embodied in a computer connected via a communication network.

The term 'communication network' as used herein can encompass any type of wireless network, such as a WiFi™, GSM™, UMTS or other wireless digital network or a cable based network, such as Ethernet™ or the like. In particular, the communication network can implement the Internet protocol (IP). For example, the communication network can comprise a combination of cable-based and wireless networks.

The term 'remote system' or 'server' as used herein can encompass any physical machine or virtual machine having a physical or virtual processor, capable of receiving; processing and sending data. A server can run on any computer including dedicated computers, which individually can also often be referred to as 'the server' or shared resources such as virtual servers. In many cases, a computer can provide several services and have several servers running. Therefore, the term server may encompass any computerized device that shares a resource with one or more client processes. Furthermore, the terms 'remote system' or 'server' can encompass a data transmission and processing system distributed over a data network (such as a cloud environment).

In a first aspect of the present disclosure, a method of creating a secure collaborative analysis system for securely using a dataset from a plurality of laboratories while ensuring confidentiality, integrity, and authenticity of input and result data among the plurality of collaborating laboratories is presented. The plurality of laboratories are communicatively connected to an execution environment. The method comprises creating a secure enclave within the execution environment for data exchange and analysis, the attestation of the execution environment and the secure enclave to verify integrity and authenticity of the system, generating a random 12-byte character inside the secure enclave to provide integrity protection for storing records in a database and building a communication component to provide a means of secure communication between the plurality of laboratories and the execution environment. The communication component comprises a trusted section within the secure enclave and an unprotected section. The plurality of laboratories communicate with the trusted part via a secure channel. The method further comprises detecting any unauthorized modification to the record stored in the database outside of the secure enclave by a records integrity component, storing the encrypted dataset in the datastore received from the plurality of laboratories, retrieving the encrypted dataset inside the secure enclave, decrypting the encrypted dataset inside the secure enclave, providing the decrypted dataset to an analysis engine component within the secure enclave for analysis, and providing results of that analysis to plurality of laboratories in the secure manner.

In a second aspect of the present disclosure, the execution environment is an Intel SGX trusted execution environment.

In a third aspect of the present disclosure, the random 12-byte character is sealed and stored in a persistent storage for future use.

In a fourth aspect of the present disclosure, the communication component further comprises certification storage, which resides in memory of the enclave.

In a fifth aspect of the present disclosure, the method further comprises sealing and de-sealing a symmetric key of the plurality of laboratories and saving and restoring data in case of system failure.

In a sixth aspect of the present disclosure, the analysis engine component performs machine learning based analysis on the combined dataset from the plurality off collaborating laboratories.

In a seventh aspect of the present disclosure, the method further comprises storing the encrypted results of the analysis for future use.

In an eighth aspect of the present disclosure, the encrypted results of the analysis are stored in the persistent storage for future use In a ninth aspect of the present disclosure, a system for collaborative analysis on a combined shared dataset is presented. The system comprises a plurality of laboratories. Each of the plurality of laboratories comprise secure client applications. The system further comprises a hardware based execution environment communicatively connected to the plurality of laboratories. The hardware based execution environment comprises an analytics server. The analytics server comprises a security sensitive enclave configured to provide a secure connection to the plurality of laboratories for the exchange of data. The security sensitive enclave comprises an encryption/decryption component to decrypt incoming data from the plurality of laboratories, an analysis engine component comprising machine learning and statistical algorithms, a record integrity checker, an access controller component, and a sealing/unsealing component. The analytics server also comprises non-security sensitive components comprising data store for storing an encrypted dataset, file handler and database handler component, and a database for account and group management of the plurality of laboratories.

In a tenth aspect of the present disclosure, the secure client applications are configured to provide secure interaction between the plurality of laboratories and the execution environment, to encrypt the data sent to the execution environment, and to perform attestation of the execution environment for each of the plurality of laboratories.

In an eleventh aspect of the present disclosure, the record integrity component is configured to detect any unauthorized modification to the record stored in the database.

In a twelfth aspect of the present disclosure, the security sensitive enclave resides in central processing unit (CPU) protected memory.

In a thirteenth aspect of the present disclosure, a method for sharing data for collaborative analysis between a plurality of laboratories is presented. The plurality of laboratories are communicatively connected to an execution environment. The method comprises downloading a client application at each of the plurality of laboratories and registering each of the plurality of laboratories, transferring and sealing a secret encryption key of the plurality of laboratories, saving the secret encryption key of the plurality of laboratories for future use, forming groups amongst the plurality of laboratories for data collection and sharing, proposing the type of analysis to be performed within the groups, pre-processing data to be shared within the groups, encrypting the data at each laboratory with its secret encryption key from the plurality of laboratories that are part of the group and transferring that data to the secure enclave in the execution environment, saving encrypted data from the plurality of laboratories to the datastore for future use, retrieving the encrypted dataset and decrypting the data and combining the data from the plurality of laboratories belonging to a group, performing analysis on the decrypted combined data, and encrypting analysis results with the secret encryption key and transferring the encrypted analysis results to the laboratory in the plurality of laboratories requesting the analysis results.

In a fourteenth aspect of the present disclosure, the groups are formed by invitation via a secret invitation code.

In a fifteenth aspect of the present disclosure, the method further comprises storing the encrypted analysis results for later retrieval.

In a sixteenth aspect of the present disclosure, the method further comprises decrypting the encrypted analysis results at each of the plurality of laboratories requesting the analysis results.

In a seventeenth aspect of the present disclosure, a non-transitory computer-readable medium storing instructions thereon which when executed by a computer system make the computer system perform the method according to the above methods.

In an eighteenth aspect of the present disclosure, a computer program product comprising instructions which, when executed by a processor of a diagnostic instrument causes the diagnostic instrument to perform the steps of the above methods.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

Typical analytical laboratory systems draw sensitive attribute interferences and perform different analytics on patient data collected during regular and routine laboratory analysis. These analytical systems are mostly deployed on third-party infrastructures, which are inherently untrustworthy. However, a collaboration between different laboratory systems can mean that there can be much more data for analytics and, hence, help develop better predictive models from that data. Therefore, a new client-server based collaborative laboratory data analytics system using the Intel® Software Guarded Extensions (Intel SGX™) trusted execution environment is proposed. This new system can allow a group of laboratory systems to come together and perform collaborative data analysis without the worry that their patient data may be leaked to anyone including to the other collaborative laboratory systems, infrastructure provider, and the like during all phases of the analytical process, i.e., at storage, during transfer, and during computation. The proposed analytics system can reduce the demand for the laboratories' trust to only the central processing unit (CPU) of the hardware while still promising to provide security and privacy guarantees.

Intel SGX™ is a hardware-based trusted execution environment that offers security guarantees similar to a Hardware Security Module/TPM-based solution but with the scalability and flexibility of a pure software solution. Intel SGX™ can be leveraged so that it can create a secure and privacy-preserving analytics system for laboratory data while maintaining the confidentiality of both the input data and results by limiting the trust to only the central processing unit (CPU) of the untrusted third-party infrastructure and the Intel SGX™ software development kit (SDK).

The proposed system is designed and implemented using the native Intel SGX™ SDK approach that is used to provide the following features/security guarantees:
1. Secure Storage, analysis, and transmission of sensitive laboratory input data and results,
2. Identification and attestation of analytics application and execution platform/hardware for integrity guarantees,
3. Secure encryption key management, and
4. Integrity protection for records stored in the database.

It should be noted that denial of service (DOS) attacks, i.e., deletion of data, operating system (OS) (un-trusted) refuse to schedule, and side-channel attacks, that is, observation by cache, memory, disk, and network access, are outside the scope of the present disclosure.

Figure 1:
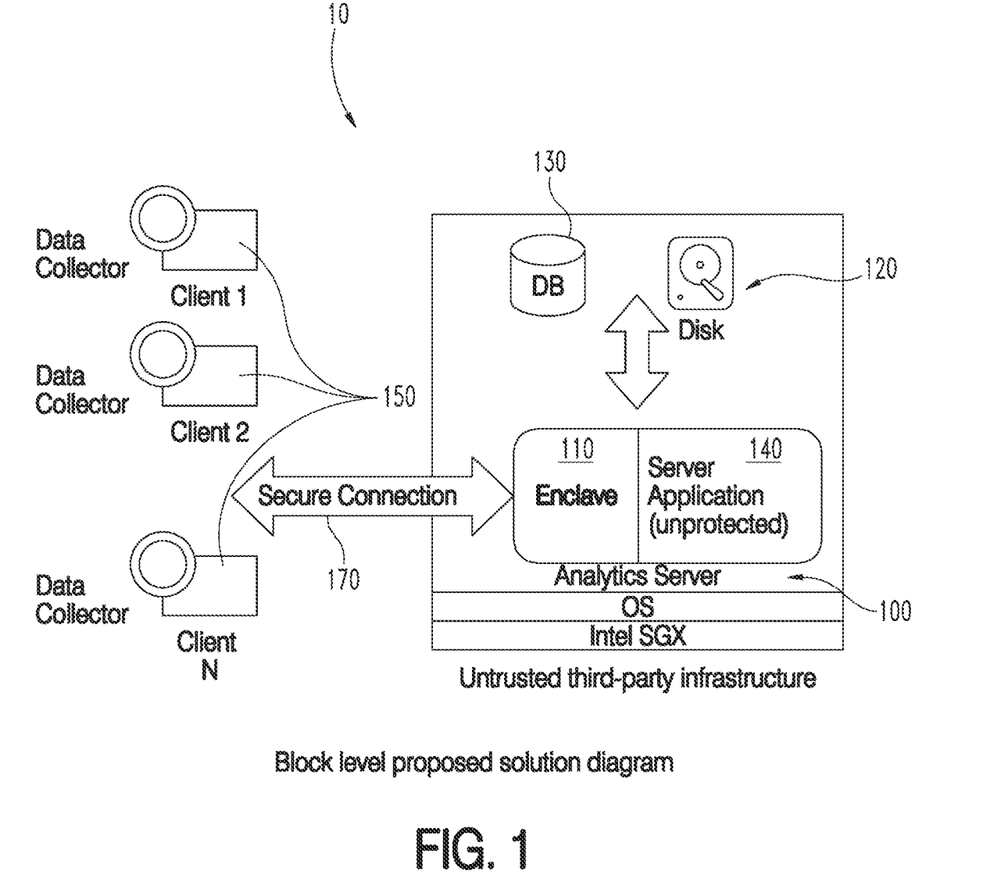
FIG. 1 illustrates a block level overview of the analytics system according to an embodiment of the present disclosure.

Referring initially to FIG. 1, FIG. 1 illustrates a block level overview of the analytics system 10. The analytics system 10 comprises the analytics server 100. The analytics server 100 comprises a secure enclave 110. The secure enclave 110 comprises the trusted parts of the analytics application that are security-sensitive such as an analysis engine component 230. The analytics server 100 also comprises the unprotected parts of the analytics application that are not security sensitive such as, for example, a persistent storage disk 120 for encrypted data storage and an account database 130 for collaborating laboratories that provides functions such as, for example, group management.

In addition, the analytics system 10 comprises a plurality of client applications that are resident on a plurality of collaborating laboratories 150. The client applications are assumed to be trusted by the analytics system 10. The plurality of client applications communicate with the analytics server 100 via a secure connection 170. Via this secure connection 170, the client applications are able to interact with the analytics server 100 in order to send/receive data and results. The data sent and received is encrypted input data and analysis results. In addition, the client applications are able to perform remote attestation of the analytics server 100.

Figure 2:
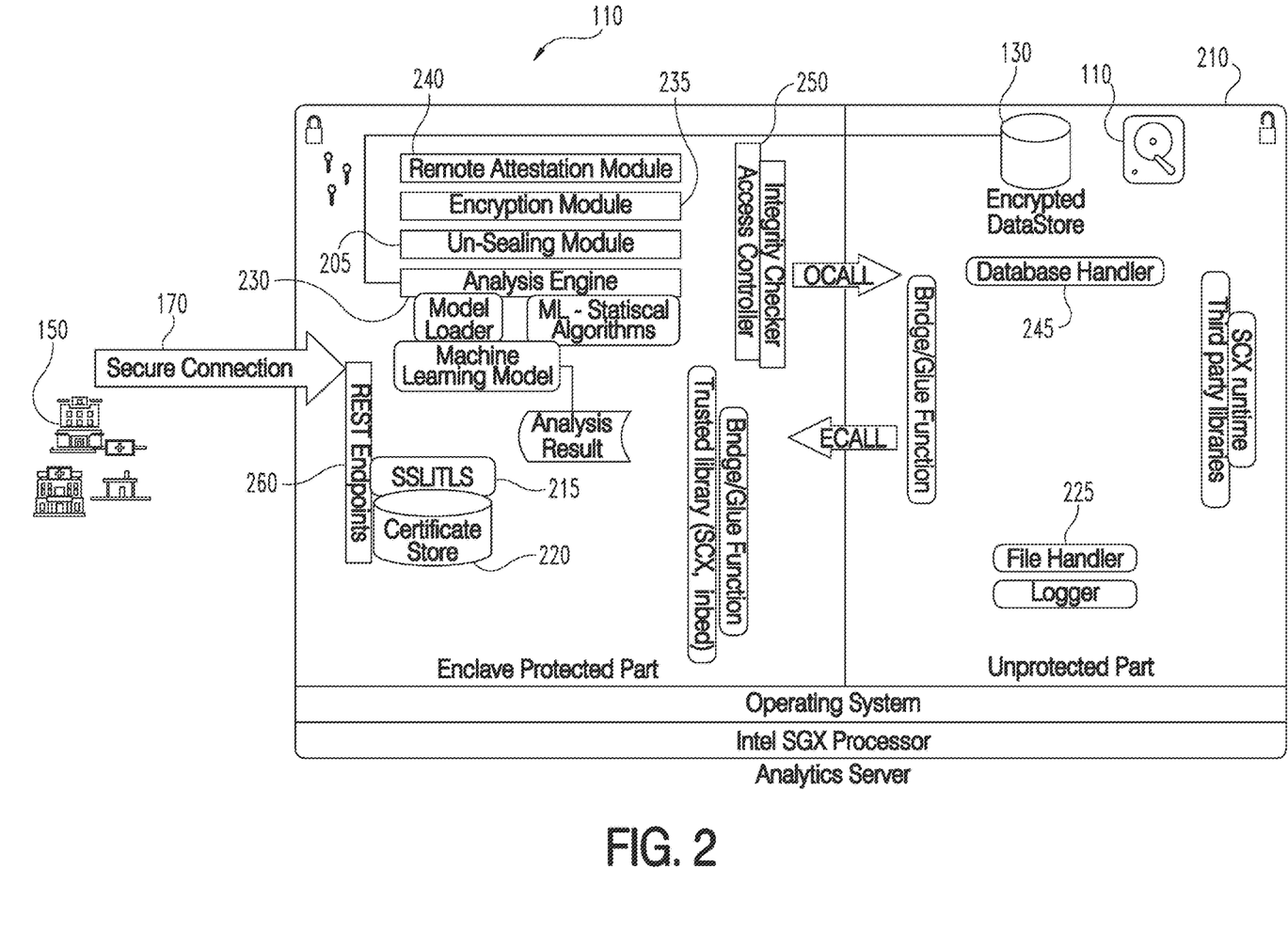
FIG. 2 illustrates a more detailed view of the analytics server according to an embodiment of the present disclosure.

Turning to a FIG. 2, FIG. 2 illustrates a more detailed view of the analytics server 100 of the analytics system 10. The secure enclave 110 resides in the CPU protected memory and cannot be modified after its creation. Any unauthorized modification to the secure enclave 110 can be detected by the Intel SGX™ and the secure enclave 110 will not be loaded. The components in the secure enclave 110 comprises the security sensitive part of the analytics server 100. All other components in the analytics server 100 that are not part of the secure enclave 110 belong to the unprotected section 210 of the analytics server 100. As the name suggests, the components in the unprotected section 210 are not protected by Intel SGX™ guaranteed protection and execute outside of the protected memory.

The first operation that occurs in the analytics server 100 is the bootstrap operation. During the bootstrap operation, the secure enclave 110 is created within the analytics server 100. After initialization of the analytics server 100, a random 12-byte character referred to as an alpha is created within the secure enclave 110. The alpha is then sealed by a sealing-unsealing component 205 to ensure the enclave identity. The alpha is then saved to persistent storage, i.e., the analytics server disk 120, for use in the future. The alpha is also utilized to provide integrity protection to the records stored in the database tables of the database 130.

Next, a communication component is built using the Intel SGX™ compatible networking library such as, for example, mbedtls. The communication component comprises two parts; the trusted part resident inside the secure enclave 110 and which is responsible for the HTTP and TLS layer 215 and the unprotected section which responsible for the TCP layer, this is done because since the Intel SGX™ does not allow network socket operation to occur within the secure enclave 110. The communication component enables the client applications of the plurality of collaborating laboratories 150 and the analytics server 100 to communicate with each other via a secure connection 170. The communication between the client applications of the plurality of collaborating laboratories 150 and the analytics server 100 is required to occur over a secure communication channel 170. In order to provide this requirement, the analytics server 100 terminates and originates the SSL/TLS connection 215 from the clients inside the secure enclave 110 to maintain integrity and confidentiality of connection 170 up to the secure enclave 110.

An auxiliary component, the certificate store 220, is a single file containing the complete X.509 certificate chain as enclave code. The certificate store 220 resides in the memory of the secure enclave 110 and cannot be modified by any attempted adversary. Also, it is should be pointed out that no secure enclave call (OCALL) is needed to load these server certificates. This approach avoids a certification chain being loaded by the unprotected code. In other words, the responsibilities of the TCP layer such as, for example, creating a socket, happen in the unprotected section 210, whereas the TLS handshake and HTTP operations occur within the secure enclave 110.

Figure 3A:
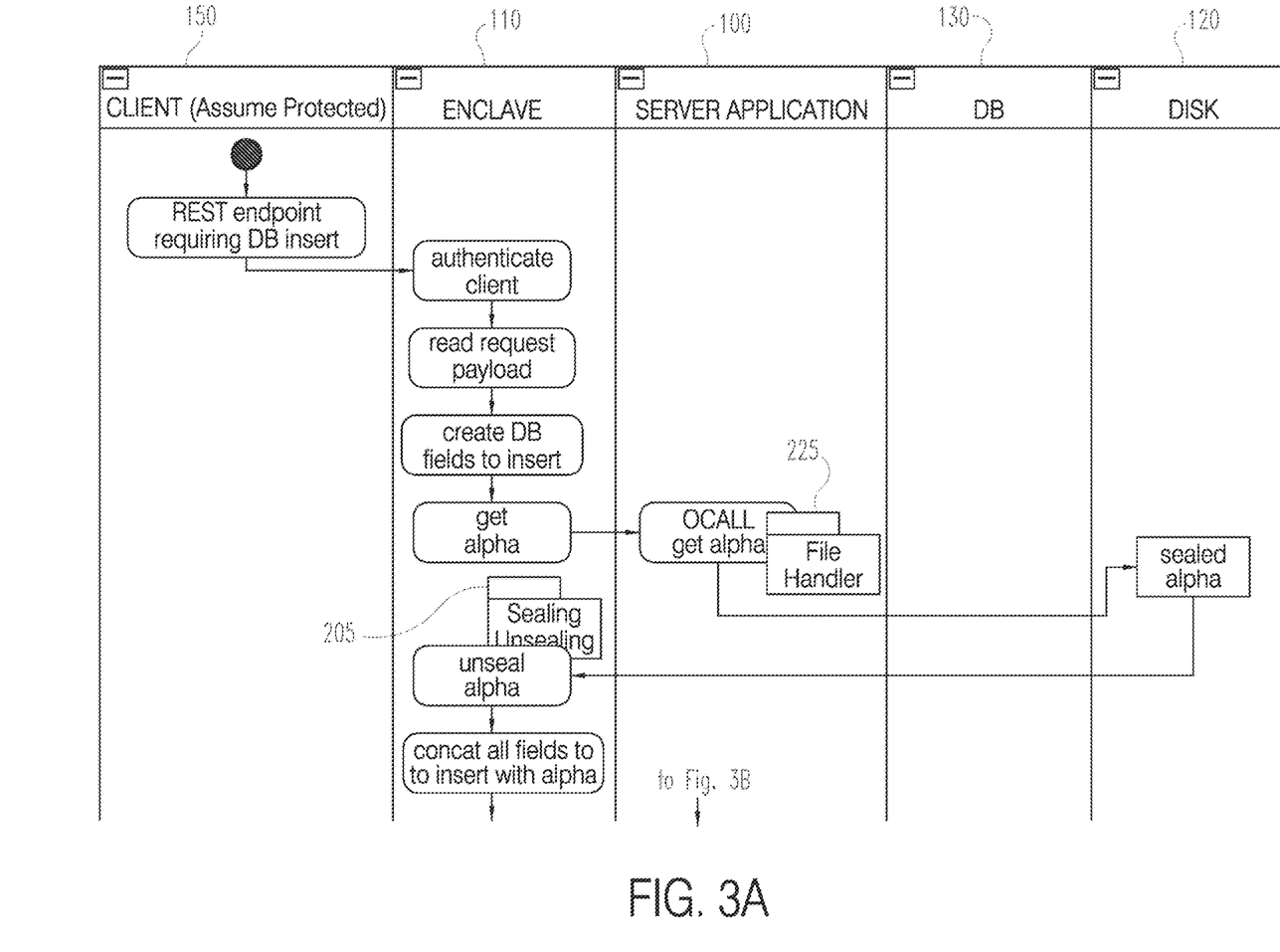
FIGS. 3A-B illustrate a swim chart diagram of the record integrity component according to an embodiment of the present disclosure.
Figure 3B:
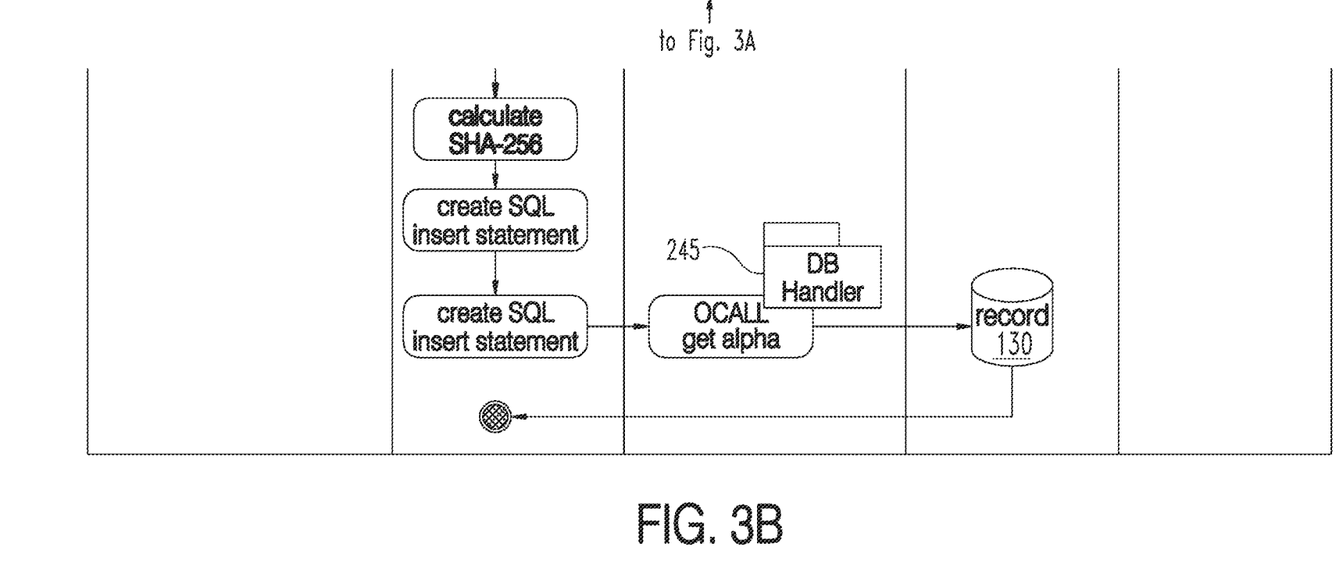

A record integrity component 250 also resides with in the secure enclave 110. The record integrity component 250 enables the analytics server 100 to detect any unauthorized modification from outside the secure enclave 110 to the records stored in the database tables 130, as illustrated in FIG. 3. Typically, it is not possible to restrict database record modification by a malicious database administrator due to root privileges of the adversary. However, by using hashing, any unauthorized record modification can be detected. In this method, for example, suppose a value is inserted in a table (e.g., c1, c2, c3), the row hash is calculated SHA-256 (e.g., c1+c2+c3+alpha). However, the alpha is a secret 12-byte character only known by the secure enclave 110. Thereby, any changes in the row rows will result in a change in its hash from the pre-computed hash and the subsequent integrity check will fail.

A file handler component 225 resides in the unprotected part 210 of the analytics server 100. Since Intel SGX™ does not allow any file operation to occur within the secure enclave 110 because such operations involves I/O operation and invoke system calls such as, for example, open, read, seek, which are not permitted to be perform inside the secure enclave 110, therefore, the file handler component 225 resides in the unprotected part 210. The analytics server system needs to read encrypted input files that are stored in the persistent store, i.e., the disk 120, to feed the files into the analysis engine component 230 resident is the secure enclave 110.

As mentioned above, the Sealing-Unsealing component 205 utilizes the sealing capabilities of the Intel SGX™. The sealing component 205 mainly does two operations, which are as follows: 1) seal and unseal the shared symmetric key of the clients/collaborators and 2) saves and restores the data with/without encryption in case of application shutdown, power failure, or for later use by the analytics server application. This component 205 is used by many components and operations. For example, the shared secret symmetric key is required to be stored persistently as it is used to encrypt and decrypt the laboratory's input data as this secret key cannot leave the protected memory in plain text. Thus, it is required that the sealing component 205 is part of the analytics server secure enclave 110.

Turning to FIGS. 3A-B, the process of the record integrity component 250 is illustrated. In the first step in FIG. 3A, a record request from one of the plurality of entrusted collaborating laboratories 150 is communicated over the secure communication connection 170 to the secure enclave 110 of analytics server 100 where the sending laboratory is authenticated. The record request is read and database field is created at the record integrity component 250.

The record integrity component 250 will now need to retrieve the alpha. The record integrity component 250 then sends an outside the secure enclave call (OCALL) to the file handler component 225 in the unprotected part 210 of the analytics server 100. The file handler component 225 then retrieves the sealed alpha from the disk 120 and provides it to the Sealing-Unsealing component 205 in the secure enclave 110. The Sealing-Unsealing component 205 unseals the alpha and inserts the alpha into the request. In FIG. 3B, the SHA-256 is calculated, an SQL insert statement is created, and an OCALL to a database handler component 245 in the unprotected part 210 of the analytics server 100 is sent to insert the record request. The database handler component 245 will then, in turn, insert the record request into the database 130.

Figure 4A:
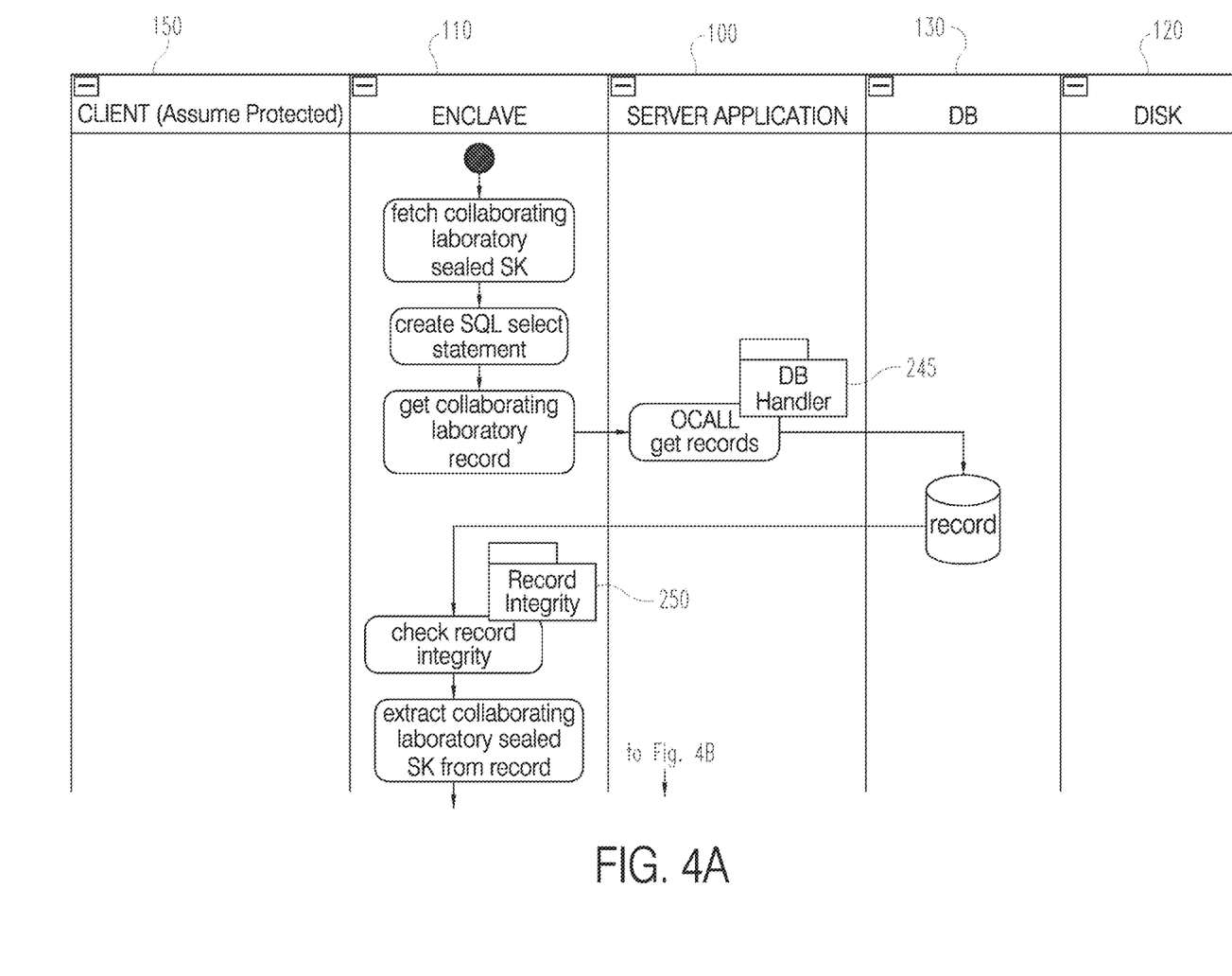
FIGS. 4A-B illustrate a swim chart diagram of the encryption-decryption component for encrypted file decryption according to an embodiment of the present disclosure.
Figure 4B:
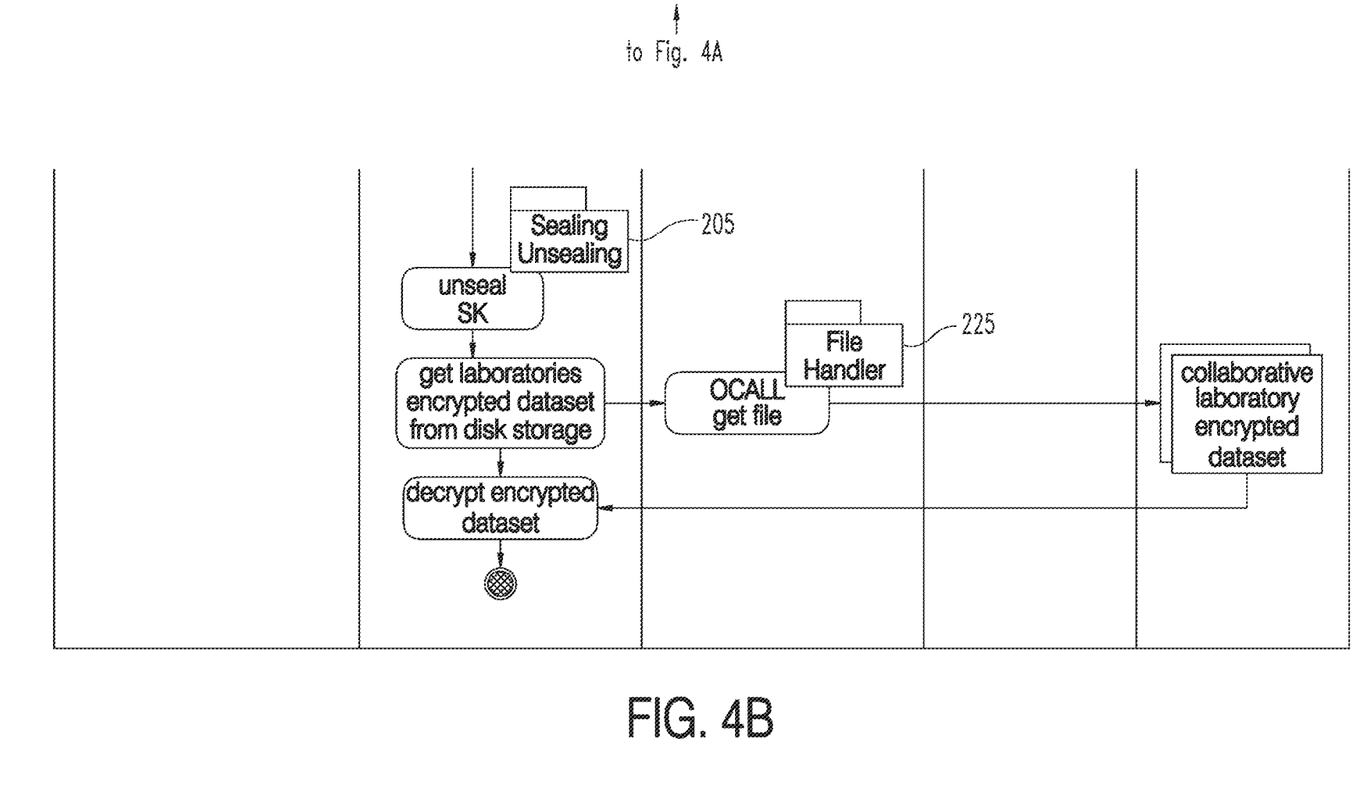

The encryption-decryption component 235 is part of the secure enclave 110 of the analytics server 100. FIGS. 4A-B illustrate a swim chart diagram of the encryption-decryption component for encrypted file decryption. The encryption-decryption component 235 is an important component from a security perspective as the encryption-decryption component 235 directly works on the collaborating laboratory-provided data and uses the shared symmetric key (SK) of the collaborating laboratory, i.e., the SK provisioned by the client.

The decryption of the encrypted input/public data of the collaborating laboratory happens in a trusted region, i.e., the secure enclave 110 or at each collaborating laboratory itself, where the decrypted data cannot be read or modified by any privileged Ring-0 software of the OS, thereby, providing confidentiality and integrity after decryption. In particular, sqx_rijndael128GCM_encryptsgx_rijndael128GCM_decrypt function is used provided by the Intel SGX™ SDK to create a custom encryption call. It is an Advanced Encryption Mode with Galois/Counter Mode (AES-GCM) 128 bits block cipher symmetric key encryption mode. Additionally, it is defined in the NIST's SP 800-38D. AES-GCM can provide both confidentiality and integrity of the data. AES-GCM can produce the same length encrypted data as of the plain text along with Initialization Vector (IV) (nonce) with MAC and enables detection of any modifications. The encryption part of this component uses 12 bytes of time-varying IV, similar to the way it used at a client collaborator laboratory. These 12 bytes of the IV is generated using another trusted Intel SGX™ library.

Turning to FIGS. 4A-B, the process of the encryption-decryption component 235 is illustrated. In the first step, the sealed symmetric key has to be fetched and a SQL select statement is created within the secure enclave 110. The encryption-decryption component 235 than sends an OCALL to the database handler component 245 in the unprotected section 210 of the analytics sever 100 to retrieve the record, i.e., containing the sealed symmetric key of the collaborating laboratory from the database 130.

The retrieved record is then sent to the record integrity component 250 in the secured enclave 110 where the record's integrity is checked and the sealed symmetric key of the collaborating laboratory is extracted from the read record. In FIG. 4B, the sealed symmetric key is, then, unsealed by the sealing-unsealing component 205 and an OCALL is sent to the file handler component 225 in the unprotected section 210 of the analytics sever 100 in order to retrieve the encrypted dataset file. The file handler component 225 retrieves the encrypted public data file from the persistent memory disk 120 and sends the encrypted public data file to the secured enclave 110 where encrypted dataset file can be decrypted for analysis.

The attestation component 240 is also part of the secure enclave 110 and utilizes the Intel SGX™ attestation capabilities (see, e.g., https://software.intel.com/content/www/us/en/develop/topics/software-guard-extensions/attestation-services.html). The private key of the analytics server application is used by the attestation component 240 component. It is important to note that this public-private key pair used by the analytics server system author for the development of this analytics server 100 and not for any encryption-decryption of the collaborating laboratories. The public key may be embedded into each of the client applications of the plurality of collaborating laboratories 150 and the private key is not known to the clients of the plurality of collaborating laboratories 150.

The attestation component 240 helps to attest the analytics server 100 by the client of the plurality of collaborating laboratories 150. The attestation component 240 can provide evidence in the form of a signature report containing 256-bit hash of the secure enclave 110 to the client application of the plurality of collaborating laboratories 150 to verify integrity and platform authenticity to make sure that nothing is not modified by an adversary.

In addition, the analytics server 100 can expose many REST endpoints 260 for different operations, e.g., collaborating laboratories group management, data analysis requests, uploading encrypted data, and the like. These endpoints 260 are requested by a client of the plurality of collaborating laboratories 150 to perform the desired action.

Figure 5:
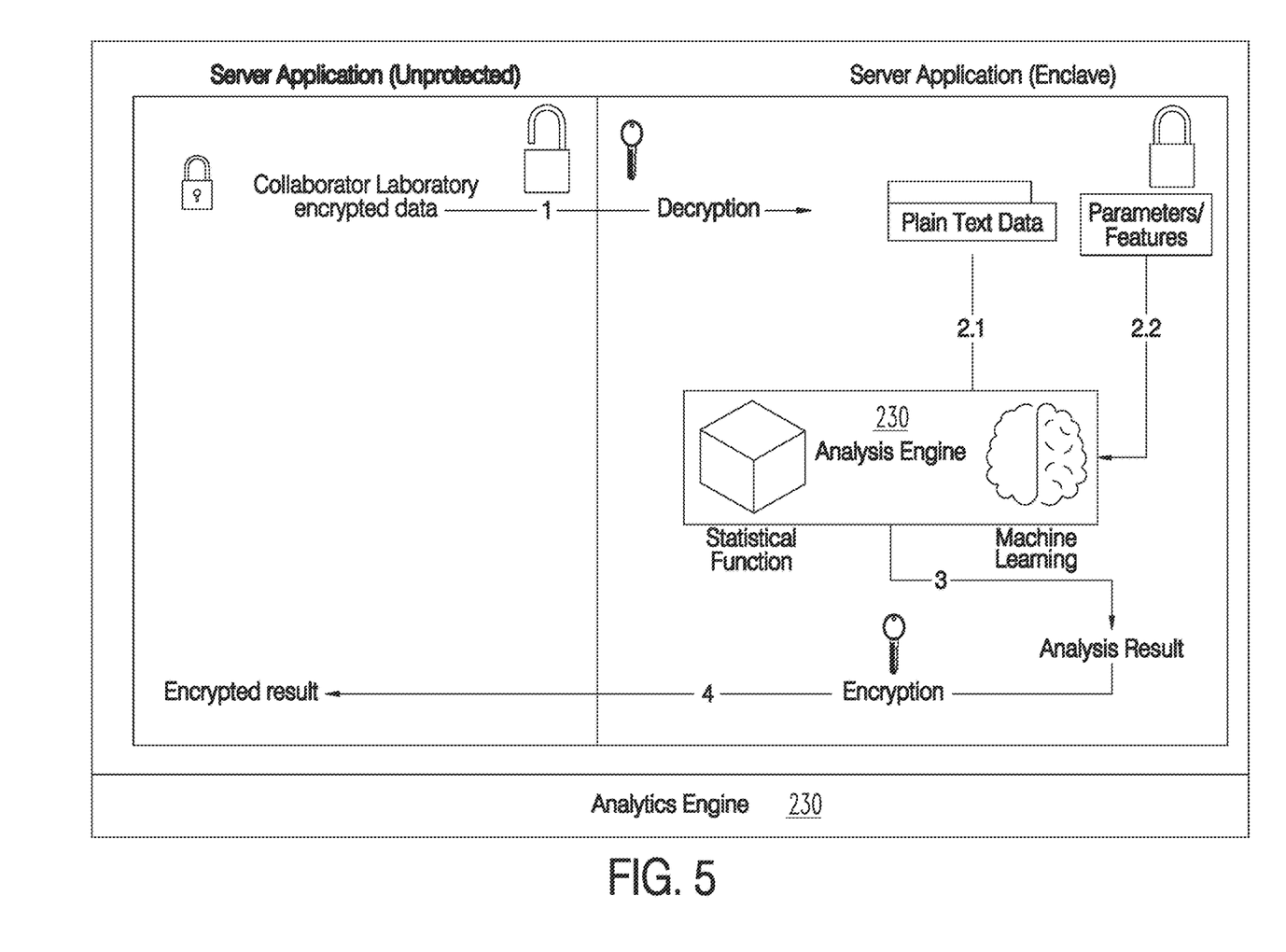
FIG. 5 illustrates an analytical engine component of the analytics system according to an embodiment of the present disclosure.

FIG. 5 illustrates an analysis engine component 230 of the analytics server 100. The analysis engine component 230 performs the required analysis on the collaborating laboratory dataset of the patients. First, the analytics server 100 receives a request to perform analysis and all of the collaborating laboratory identifications of the group are retrieved using a database handler component 240 from the database 130. The secure enclave 110 then retrieves the encrypted dataset of the collaborator laboratories 150 from the persistent storage disk 120 via the file handler component 225 and brings it inside the secure enclave 110.

The data of each of the collaborating laboratories 150 is decrypted using the encryption-decryption component 235 by first loading and then unsealing the sealed symmetric key of each of the participating laboratory by the unsealing component 205. The collection of decrypted datasets of the combined participating collaborating laboratories 150 is used to perform the inference analysis of the input data of the patients. All the analysis happens within the secure enclave 110 due to the sensitivity of the data. The analysis engine 230 the runs the analytics algorithm/operation on the aggregated data using statistical functions and/or machine learning and returns the analysis results. The analysis results are then encrypted by the collaborator symmetric key and either sent to the plurality of collaborating laboratories 150 or saved to the persistent storage disk 120 for later reuse.

Figure 6A:
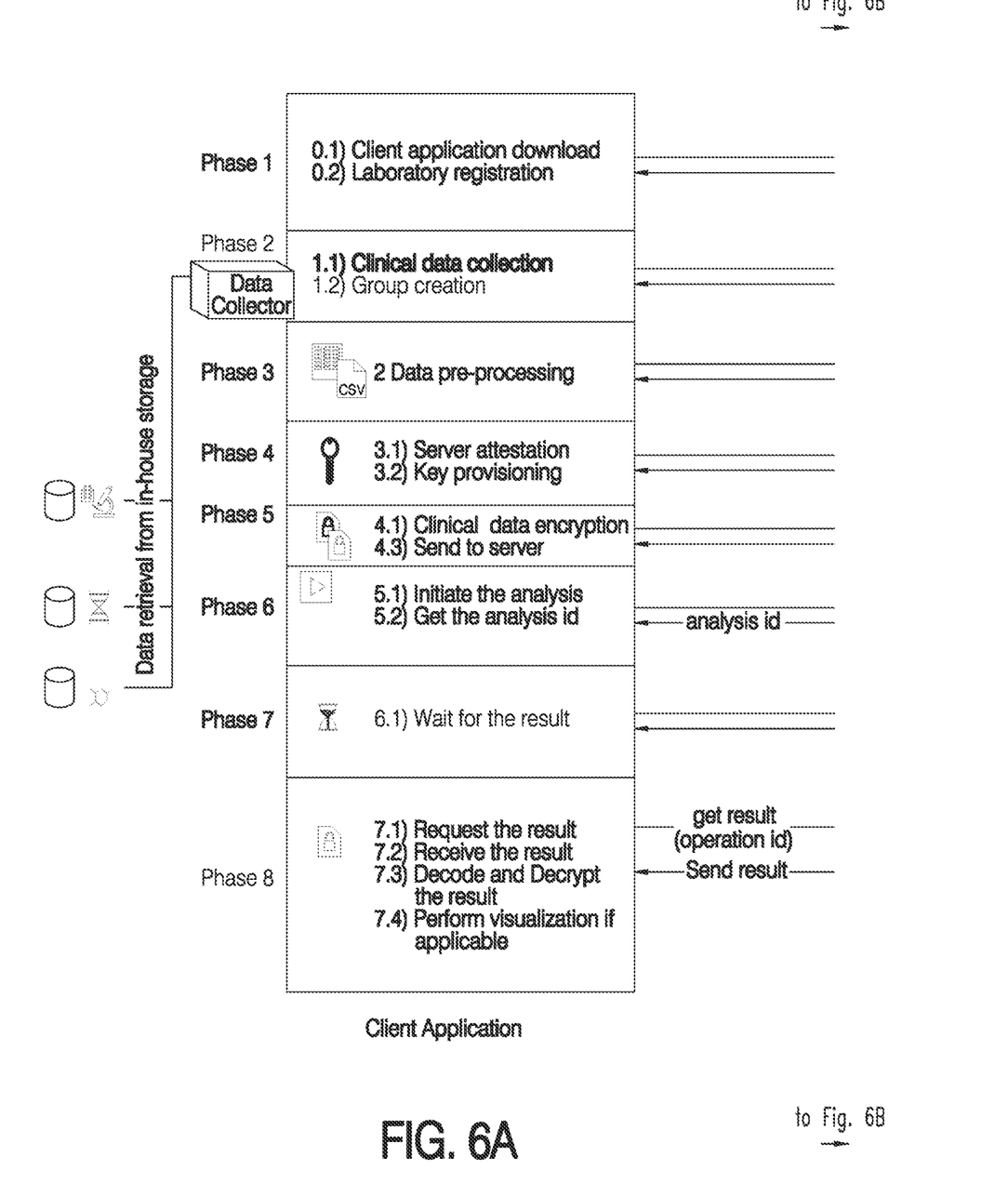
FIGS. 6A-B illustrate a workflow for the collaborative data analysis according to an embodiment of the present disclosure.
Figure 6B:
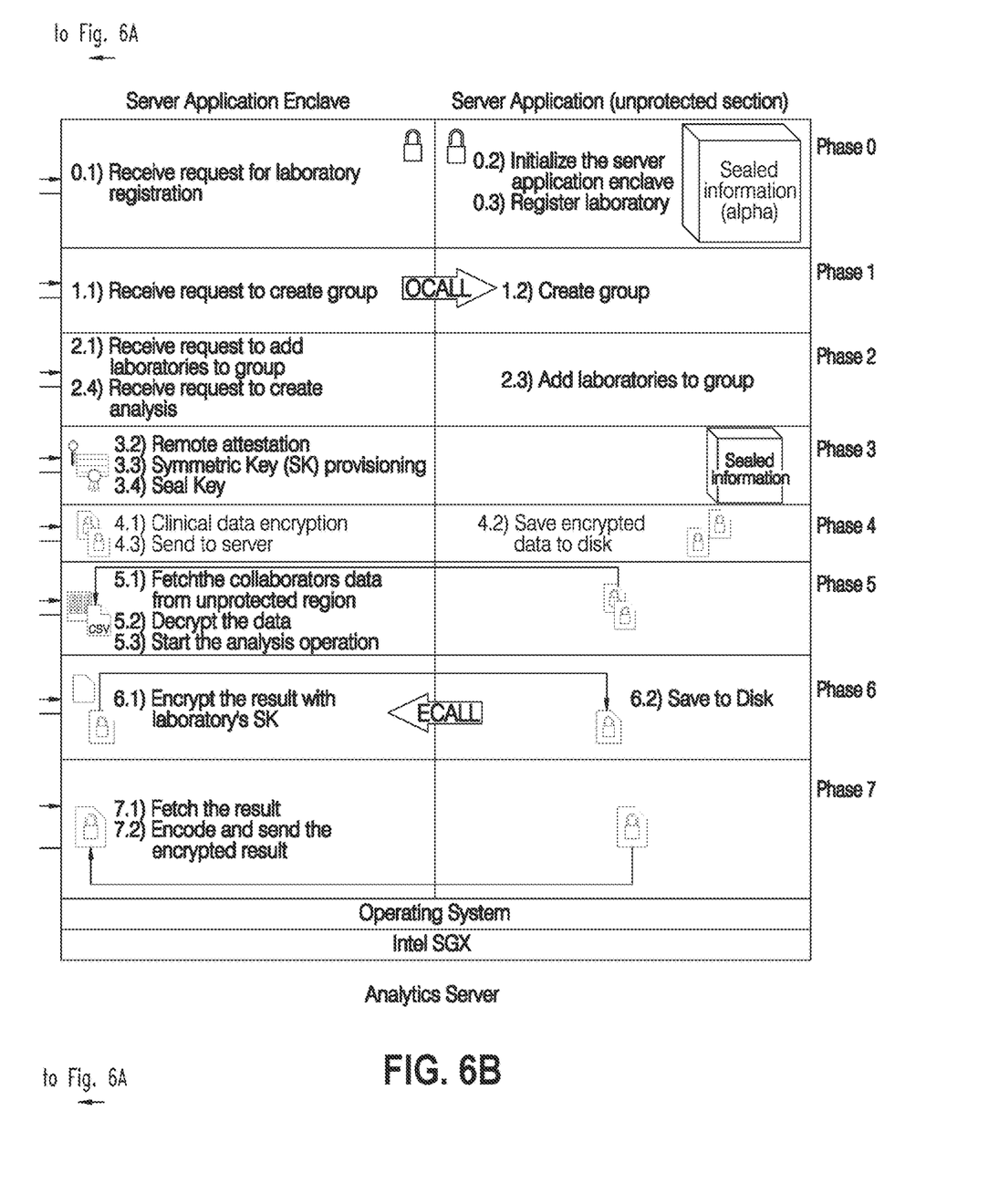

FIGS. 6A-B illustrate a typical workflow for the collaborative data analysis. The workflow comprises of eight different phases. In the first phase, the client application is downloaded by each of the laboratories in the plurality of collaborating laboratories 150 and registered by sending a request to the secure enclave 110 of the analytics server 100. This request triggers the initialization of the server application enclave 110, the sealing of the alpha, and the registration of the laboratory.

In the second phase, groups of collaborating laboratories 150 are formed by the secure enclave 110 receiving a request to create a group and the secure enclave 110 sending an OCALL to the unsecured section 210 of the analytics server 100 to create the group of collaborating laboratories. Clinical data is then collected from the plurality of collaborating laboratories 150. Laboratories can be invited to join the group of collaborating laboratories 150 by receiving a secret invitation code.

In the third phase, data pre-processing may be conducted if required. The invited collaborating laboratories 150 can join the group. The specific format of the collected clinical data will be specified and the already existing clinical data from the collaborating laboratories 150 in the group will be cleaned based on the specified format.

In the fourth phase, analytics server attestation and each of the laboratory's symmetric encryption key provisioning is performed. Attestation of the analytics server 100 may be done randomly at any point of time and, after successfully attestation, the symmetric keys of the collaborating laboratories 150 may be provisioned and sealed.

In the fifth phase, the clinical data provided by each of the collaborating laboratories in the created group will be encrypted using the respective symmetric key of the collaborating laboratory and transferred to the analytics server 100. The encrypted clinical data received by the analytics server 100 can be saved to the persistent disk 120 in the unprotected section 210 of the analytics server 100.

In the sixth phase, the encrypted clinical data from the collaborating laboratories 150 in the group can be retrieved from the persistent disc 120 into secure enclave 110 and decrypted. The decrypted clinical data can then be combined and inference analysis can be performed on the combined clinical dataset using the analysis engine 230.

In the seventh phase, the results of the inference analysis can be encrypted with the symmetric key of the collaborating laboratory 150. The encrypted results can, then, be saved to the persistent storage disk 120 in the unprotected section 210 of the analytics server 100 for later retrieval, sent directly to the collaborating laboratories 150 in the group in encrypted form, or both.

Finally, in the eighth phase, at a later time also, the collaborating laboratories 150 of the group can request the encrypted results be sent to them. In this phase, the secure enclave 110 can retrieve the encrypted results from the persistent storage disk 120 and send the encrypted results to the requesting collaborating laboratories 150. Once the encrypted results are received by the collaborating laboratories 150, each laboratory can decrypt the encrypted results using the predefined symmetric key.

Through the use of this system and method, the level of trust on a third-party analytics system can be minimized. In addition, the level of trust can also be minimized for the infrastructure in which laboratories can share and perform laboratory data analysis in a collaborative fashion without worrying about privacy and security risks. This system and method can provide secure data transfer between client and analytics server 100, secure data storage, as well as security-oriented and privacy-preserving data analysis, i.e., confidentiality of data at rest, in transit, and in use.

Further disclosed and proposed is a computer program including computer-executable instructions for performing the method according to the present disclosure in one or more of the embodiments enclosed herein when the program can be executed on a computer or computer network. Specifically, the computer program may be stored on a computer-readable data carrier. Thus, specifically, one, more than one or even all of method steps as disclosed herein may be performed by using a computer or a computer network, preferably by using a computer program.

Further disclosed and proposed is a computer program product having program code, in order to perform the method according to the present disclosure in one or more of the embodiments enclosed herein when the program is executed on a computer or computer network. Specifically, the program code may be stored on a computer-readable data carrier.

Further disclosed and proposed is a data carrier having a data structure stored thereon, which, after loading into a computer or computer network, such as into a working memory or main memory of the computer or computer network, may execute the method according to one or more of the embodiments disclosed herein.

Further disclosed and proposed is a computer program product with program code stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Further disclosed and proposed is a modulated data signal, which contains instructions readable by a computer system or computer network, for performing the method according to one or more of the embodiments disclosed herein.

Referring to the computer-implemented aspects of the present disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing measurements.

Further disclosed and proposed is a computer or computer network comprising at least one processor, wherein the processor is adapted to perform the method according to one of the embodiments described in this description.

Further disclosed and proposed is a computer loadable data structure that is adapted to perform the method according to one of the embodiments described in this description while the data structure is being executed on a computer.

Further disclosed and proposed is a storage medium, wherein a data structure is stored on the storage medium and wherein the data structure is adapted to perform the method according to one of the embodiments described in this description after having been loaded into a main and/or working storage of a computer or of a computer network.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A method for securely using datasets from a plurality of laboratories communicatively connected to an execution environment, the method comprising:

providing, by the execution environment,
- a secure enclave within the execution environment, wherein the secure enclave comprises: a record integrity component, an encryption-decryption component, and an analysis engine component,
- a section outside the secure enclave, wherein the section outside the secure enclave comprises: a database and a persistent storage disk, and
- a communication component comprising a secure channel to provide communication between the plurality of laboratories and the execution environment;

generating, by the secure enclave, a random character;
sealing the random character;
storing the sealed random character in the persistent storage disk;
determining, by the record integrity component within the secure enclave, whether an unauthorized modification to a record stored in the database of the section outside the secure enclave is made at least partially based on the random character, wherein the determining whether the unauthorized modification to the record is made comprises:
- retrieving the sealed random character from the persistent storage disk;
- unsealing the sealed random character;
- computing a hash character based on the random character and further based on the record; and
- determining whether the hash character computed based on the random character equals a pre-computed hash;

receiving, by the execution environment via a client application of a laboratory of the plurality of laboratories, an encryption key;
receiving, by the communication component of the execution environment, an encrypted dataset associated with the laboratory of the plurality of laboratories, wherein the encrypted dataset is encrypted based on the encryption key;
storing, by the execution environment, the encrypted dataset in the persistent storage disk in the section outside the secure enclave;
retrieving, by the execution environment, the encrypted dataset from the persistent storage disk and providing the encrypted dataset to the secure enclave;
decrypting, by the encryption-decryption component, the encrypted dataset inside the secure enclave based on the encryption key; and
providing, by the execution environment, the decrypted dataset to the analysis engine component within the secure enclave for analysis.

2. The method of claim 1, wherein the communication component further comprises certification storage, wherein the certification storage resides in memory of the secure enclave.

3. The method of claim 1, further comprising:
retrieving, by the execution environment, the encryption key for the decryption of the encrypted dataset;
prior to the decryption of the encrypted dataset, unsealing, by a sealing-unsealing component of the secure enclave, the encryption key.

4. The method of claim 1, wherein:
the dataset comprises a combination of dataset from each of the plurality of laboratories, and
the analysis engine component performs machine learning based analysis on the combination of dataset.

5. The method of claim 1, further comprising:
storing, by the execution environment, the results of the analysis in the persistent storage disk.

6. The method of claim 1, further comprising:
saving, by a sealing-unsealing component of the secure enclave, the encrypted dataset; and
in accordance with a determination of an occurrence of a system failure, restoring, by the sealing-unsealing component of the secure enclave, the encrypted dataset via the saved encrypted dataset.

7. The method of claim 1, further comprising transmitting, by the execution environment, results of the analysis to the plurality of laboratories.

8. The method of claim 1, wherein the random character comprises a random 12-byte character.

9. The method of claim 1, further comprising encrypting, by the execution environment, results of the analysis based on the encryption key.

10. The method of claim 1, wherein the record stored in the database of the section outside the secure enclave comprises the encryption key.

11. A method for sharing data for analysis between a plurality of laboratories communicatively connected to an execution environment, the method comprising:
downloading a client application at each of the plurality of laboratories;
registering the each of the plurality of laboratories;
transmitting and sealing an encryption key of the plurality of laboratories;
saving the encryption key of the plurality of laboratories;
forming groups amongst the plurality of laboratories;
determining a type of analysis to be performed for each of the groups;
pre-processing data to be shared within the groups;
encrypting the data at each laboratory with the respective encryption key of the plurality of laboratories;
saving encrypted data from the plurality of laboratories to a datastore;
generating, by a secure enclave within the execution environment, a random character;
sealing the random character;
storing the sealed random character in a persistent storage disk outside the secure enclave;
determining, within the secure enclave, whether an unauthorized modification to a record is made at least partially based on the random character, wherein the determining whether the unauthorized modification to the record is made comprises:
retrieving the sealed random character from the persistent storage disk;
unsealing the sealed random character;
computing a hash character based on the random character and further based on the record; and
determining whether the hash character computed based on the random character equals a pre-computed hash;

retrieving the encrypted data;
decrypting the encrypted data;
combining at least a portion of the decrypted data, the portion of the decrypted data associated with one of the groups;
performing analysis on the combined decrypted data;
encrypting analysis results with the encryption key; and
transmitting the encrypted analysis results.

12. The method of claim 11, wherein each of the groups is formed via an invitation to laboratories of the respective group, the invitation comprising an invitation code.

13. The method of claim 11, further comprising:
storing the encrypted analysis results.

14. The method of claim 11, further comprising:
decrypting the encrypted analysis results at the laboratory of the plurality of laboratories requesting the analysis results.

15. A system for securely using datasets from a plurality of laboratories, comprising:
an execution environment communicatively connected to the plurality of laboratories,
wherein the execution environment comprises:
a secure enclave comprising: a record integrity component, an encryption-decryption component, and an analysis engine component;
a section outside the secure enclave, wherein the section outside the secure enclave comprises: a database and a persistent storage disk; and
a communication component comprising a secure channel to provide communication between the plurality of laboratories and the execution environment; and
a CPU protected memory, wherein the secure enclave resides in the CPU protected memory;
wherein the execution environment is configured to perform a method comprising:
generating, by the secure enclave, a random character;
sealing the random character;
storing the sealed random character in the persistent storage disk;
determining, by the record integrity component within the secure enclave, whether an unauthorized modification to a record stored in the database of the section outside the secure enclave is made at least partially based on the random character, wherein the determining whether the unauthorized modification to the record is made comprises:
retrieving the sealed random character from the persistent storage disk;
unsealing the sealed random character;
computing a hash character based on the random character and further based on the record; and
determining whether the hash character computed based on the random character equals a pre-computed hash;
receiving, via a client application of a laboratory of the plurality of laboratories, an encryption key;
receiving, by the communication component of the execution environment, an encrypted dataset associated with the laboratory of the plurality of laboratories, wherein the encrypted dataset is encrypted based on the encryption key;
storing the encrypted dataset in the persistent storage disk in the section outside the secure enclave;
retrieving the encrypted dataset from the persistent storage disk and providing the encrypted dataset to the secure enclave;
decrypting, by the encryption-decryption component, the encrypted dataset inside the secure enclave based on the encryption key; and
providing the decrypted dataset to the analysis engine component within the secure enclave for analysis.

16. The system according to claim 15, wherein the client application is configured to:
initiate interaction between the laboratory of the plurality of laboratories and the execution environment; and
perform attestation of the execution environment at the laboratory of the plurality of laboratories.

* * * * *